(12) United States Patent
Dusserre et al.

(10) Patent No.: US 12,333,870 B2
(45) Date of Patent: Jun. 17, 2025

(54) METHOD FOR DIAGNOSING A VEHICLE ELECTRICAL SYSTEM OF A VEHICLE

(71) Applicant: Robert Bosch GmbH, Stuttgart (DE)

(72) Inventors: Etienne Dusserre, Heilbronn (DE); Olaf Brust, Kirchheim Unter Teck (DE)

(73) Assignee: ROBERT BOSCH GMBH, Stuttgart (DE)

(*) Notice: Subject to any disclaimer, the term of this patent is extended or adjusted under 35 U.S.C. 154(b) by 232 days.

(21) Appl. No.: 17/824,331

(22) Filed: May 25, 2022

(65) Prior Publication Data

US 2022/0383672 A1    Dec. 1, 2022

(30) Foreign Application Priority Data

May 27, 2021    (DE) .................... 10 2021 205 383.1

(51) Int. Cl.
*G07C 5/08*    (2006.01)
*G06F 7/57*    (2006.01)

(52) U.S. Cl.
CPC ............. *G07C 5/0808* (2013.01); *G06F 7/57* (2013.01)

(58) Field of Classification Search
CPC .. G07C 5/0808; G07C 2205/02; G07C 5/008; G06F 7/57; G05B 23/0208; G05B 19/0428; G05B 2219/2603; G05B 2223/06; G05B 23/0213; G05B 2219/24065; H04L 69/08; H04L 43/50; H04L 12/40; H04L 2012/40215; H04L 2012/40273; H04L 67/12
See application file for complete search history.

(56) References Cited

U.S. PATENT DOCUMENTS 7,092,803 B2*    8/2006    Kapolka ................ G06Q 10/08
                                                      701/32.4
2019/0079842 A1*    3/2019    Chae ................... G06F 11/3006

FOREIGN PATENT DOCUMENTS

| CN | 104216391 B | * | 4/2017 | |
| DE | 102015121078 A1 | | 6/2016 | |
| DE | 112019004036 T5 | | 5/2021 | |
| WO | WO-2019005472 A1 | * | 1/2019 | ............. B60R 11/00 |

OTHER PUBLICATIONS

Machine Translation CN-104216391-B (Year: 2017).*
ISO 15765-2:Apr. 2016 Standard, "Road Vehicles—Diagnostic Communication Over Controller Area Network (DOCAN)—Part 2: Transport Protocol and Network Later Services," ISO, 2016, pp. 1-60.
ISO 14229-1:2020 Standard, "Road Vehicles—Unified Diagnostic Services (UDS)—Part 1: Application Layer," ISO, 2020, pp. 1-480.

* cited by examiner

*Primary Examiner* — Anne Marie Antonucci
*Assistant Examiner* — Misa H Nguyen
(74) *Attorney, Agent, or Firm* — NORTON ROSE FULBRIGHT US LLP

(57) ABSTRACT

A method for diagnosing a vehicle electrical system of a vehicle including a plurality of intercommunicating arithmetic logic units. A diagnostic application is executed on one arithmetic logic unit of the plurality of arithmetic logic units. The diagnostic application receives a diagnostic inquiry from an external diagnostic unit. The diagnostic inquiry is analyzed by the diagnostic application. Based on the content of the diagnostic inquiry, the diagnostic application sends data to at least one arithmetic logic unit and/or sends a diagnostic response to the external diagnostic unit.

19 Claims, 3 Drawing Sheets

METHOD FOR DIAGNOSING A VEHICLE ELECTRICAL SYSTEM OF A VEHICLE

CROSS REFERENCE

The present application claims the benefit under 35 U.S.C. § 119 of German Patent Application No. DE 10 2021 205 383.1 filed on May 27, 2021, which is expressly incorporated herein by reference in its entirety.

FIELD

The present invention relates to a method for diagnosing a vehicle electrical system of a vehicle, to an arithmetic logic unit and computer program for carrying out said method, and to vehicle electrical system of this kind.

BACKGROUND INFORMATION

Vehicle electrical systems (in particular data networks) of a vehicle typically comprise a plurality of different vehicle controllers that directly or indirectly intercommunicate. For this purpose, various communications media such as buses (e.g., CAN or LIN buses or Ethernet) are typically used. To diagnose a vehicle electrical system of this kind (vehicle diagnostics), an external diagnostic tester (often also just referred to as a tester) can be used, which is coupled to the vehicle electrical system communicatively (for data transmission). In this case, diagnostics should be construed to mean that various pieces of information are queried from the vehicle electrical system or its controllers, or are specified for this purpose, where applicable using special diagnostic operating modes of the controllers.

SUMMARY

According to the present invention, a diagnostics method, an arithmetic logic unit and a computer program for carrying out said method, and a vehicle electrical system are provided. Advantageous configurations and example embodiments of the present invention are disclosed herein.

The present invention concerns diagnostics on a vehicle electrical system of a vehicle that comprises a plurality of intercommunicating arithmetic logic units (so-called "controllers"). As mentioned, to diagnose a vehicle electrical system of this kind, an external diagnostic tester, or generally also an external diagnostic unit, can be used, which is coupled to the vehicle electrical system communicatively (for data transmission). This can be done during a visit to a garage or during vehicle development, for example. For this purpose, each controller is usually assigned a diagnostic address. The external diagnostic unit can unambiguously address a controller via said address. For this purpose, the diagnostic unit has to know the addresses of the controllers of interest in the vehicle.

In modern vehicles, access to the controllers can be implemented via a so-called "diagnostic gateway." On the basis of the diagnostic address, the diagnostic gateway relays a diagnostic message from the diagnostic unit to the addressed controller and accordingly relays the response of the controller back to the diagnostic unit. In the process, the address can be translated in the diagnostic gateway, for example from a logical address into a CAN identifier. When a diagnostic gateway is used, however, the diagnostic unit is unable to access signals within the vehicle, such as actual values transmitted on the network, since these are not relayed by the diagnostic gateway.

Within the context of the present invention, the use of so-called "system diagnostic software" is now provided. This software is a diagnostic application (software) that is executed on one arithmetic logic unit of the plurality of arithmetic logic units of the vehicle electrical system. By way of a diagnostic application of this kind (a software component in the vehicle), a multi-ECU system ("electronic control unit," i.e., a controller) in the vehicle can be displayed as an entity to an accessing diagnostic unit. For this purpose, the diagnostic application receives a distinct address for the multi-ECU system, and the entire system or vehicle electrical system can be addressed via the address for diagnostic purposes. These diagnostic purposes include, for example, reading out actual values and faults, controlling actuators, starting up routines, and reprogramming the system.

In this context, not only are controllers or vehicle controllers taken into consideration as arithmetic logic units, but also actuators and sensors, provided these have a corresponding processor or the like and can receive and send data and signals. So-called main vehicle computers, which are high-performance arithmetic logic units, are also taken into consideration. Fundamentally, any arithmetic logic unit in the vehicle electrical system can be taken into consideration as the arithmetic logic unit on which the diagnostic application is executed, but expediently the arithmetic logic unit is a controller, in particular the main vehicle computer.

In accordance with an example embodiment of the present invention, during the diagnostics, the diagnostic application then receives a diagnostic inquiry from an external diagnostic unit (the tester); this diagnostic inquiry is then analyzed by the diagnostic application and, on the basis of the content of the diagnostic inquiry, the diagnostic application then sends data to at least one arithmetic logic unit (in the vehicle electrical system) and/or a diagnostic response is sent to the external diagnostic unit.

For this purpose, the analysis of the diagnostic inquiry can in particular comprise determining at least one arithmetic logic unit, of the plurality of arithmetic logic units, that is addressed in the diagnostic inquiry, communication with the at least one addressed arithmetic logic unit then being carried out from the diagnostic application.

To determine which arithmetic logic units are addressed, the diagnostic application preferably requires information on the system (or vehicle electrical system); this information is also referred to as system information below. This information includes, for example, the assignment of diagnostic information to an arithmetic logic unit. It is therefore in particular source information, i.e., information regarding which message has to be relayed to which controller(s). This system information can be either stored in the diagnostic application (static) or trained (dynamic). By way of example, this can be done initially or whenever there is a change to or in a controller (e.g., in the event of a software update).

In the process, a diagnostic inquiry can include various kinds of messages (diagnostic messages). A first type of message is a service message. A service message of this kind in particular addresses at least one arithmetic logic unit, of the plurality of arithmetic logic units, from which diagnostic data are to be read out and/or to which diagnostic data are to be delivered. The diagnostic application relays a service message of this kind, or where applicable the diagnostic data (contained therein), to the at least one addressed arithmetic logic unit. The arithmetic logic unit in question then returns the diagnostic data to the diagnostic application, or the diagnostic application receives said data and they are sent to the external diagnostic unit as a part of the diagnostic response.

However, it is also possible that the diagnostic application sends diagnostic data concerning at least one arithmetic logic unit to the external diagnostic unit as a part of the diagnostic response without the message having been previously relayed to an arithmetic logic unit. For this purpose, the diagnostic application can in particular analyze data and/or signals exchanged between the plurality of arithmetic logic units and generate expanded diagnostic information on the basis thereof, on which basis the diagnostic data are then determined and sent to the external diagnostic unit as a part of the diagnostic response.

This analysis of the exchanged data or signals, and the generation of expanded diagnostic information on the basis thereof, can preferably be carried out independently of the timing of a diagnostic inquiry, for example regularly, when an event occurs, or always at predetermined times, for example after or during start-up of the vehicle electrical system. This expanded diagnostic information can then, for example, be stored in a memory and used as required. The source of the expanded diagnostic information is in particular stored in the system information.

A further type of message is a control message, which addresses at least one arithmetic logic unit, of the plurality of arithmetic logic units, that is to be put into a predetermined state, for example into a special diagnostic mode in which other data and/or other signals are output as usual. In accordance with an example embodiment of the present invention, for this purpose, the diagnostic application in particular relays the control message to the at least one addressed arithmetic logic unit and/or puts the at least one addressed arithmetic logic unit into the predetermined state.

A further type of message is a programming message, which addresses precisely one arithmetic logic unit, of the plurality of arithmetic logic units, to which program data (e.g., for controller software) are to be written and/or from which program data are to be read. In accordance with an example embodiment of present invention, for this purpose, the diagnostic application in particular relays, to the one addressed arithmetic logic unit, the programming message or program data to be written, and/or program data are received from the one addressed arithmetic logic unit, and then in particular sends them to the external diagnostic unit as the diagnostic response (or as a part thereof where applicable).

By way of example, in accordance with the present invention, the diagnostic application thus collects and generates diagnostic information regarding the entire vehicle electrical system or the system. It makes this information available (as the diagnostic response) to the diagnostic unit on request (via the diagnostic inquiry). During communication with the diagnostic unit, only the address of the diagnostic application is used. To collect the information, the diagnostic application can use various methods. These include, for example, relaying diagnostic messages, for which purpose the obtained diagnostic message is relayed to one or more arithmetic logic units on the basis of its content. The information obtained therefrom is then communicated to the diagnostic unit by the diagnostic application as information regarding the vehicle electrical system or the system.

In accordance with an example embodiment of the present invention, the diagnostic application can have access to a normal communication (with exchange of data and signals) in the vehicle electrical system. For this purpose, the diagnostic application receives data or signals from the communication between the arithmetic logic units or controllers (for example by eavesdropping on the network) and generates expanded diagnostic information therefrom. To generate diagnostic information on the entire system, the diagnostic application can combine information from the two options. In addition, for example, the diagnostic application distributes certain diagnostic inquiries of the diagnostic unit as required to one or more arithmetic logic units, for example when the system is being reprogrammed. For the communication between the diagnostic unit and diagnostic application on the one hand, and between the diagnostic application and the addressed controller on the other hand, it is possible that different protocols or communication protocols are used.

In this context, the difference from a diagnostic gateway is in particular the identification of the target arithmetic logic units or target controllers. This is based on the content of the diagnostic inquiry or diagnostic message and not on the diagnostic address of a controller.

Overall, therefore, different advantages are produced. A reduction in the complexity in the diagnostic unit is possible (fewer addresses required), and information from a plurality of controllers or arithmetic logic units can be merged to form diagnostic information. Up to now, this has typically been carried out in the diagnostic unit.

In addition, expanded diagnostics are possible. For instance, expanded diagnostic information can be generated from signals in the diagnostic application, for example fault codes for the system. In the process, the signals themselves need not be disclosed, but merely the diagnostic information.

Expanded diagnostic functions such as algorithms for predictive diagnostics for the system can be implemented in the diagnostic application and need not be disclosed since the diagnostic application only publishes the relevant information for the diagnostics, but not the manner in which it was generated.

Moreover, reduced complexity for the integration is achieved. When developing the diagnostics, only the diagnostic application has to be known as an entity of the diagnostic unit. Likewise, simplified customer adaptation is achieved since different requirements in the diagnostic protocol of a new customer, for example, no longer need to be implemented in each controller; instead, the diagnostic application can perform a translation.

By merging redundant information from various controllers into one piece of system information, system-based diagnostics can be developed.

An arithmetic logic unit according to the present invention, for example a controller of a vehicle, is configured, in particular programmed, to carry out a method according to the present invention.

Implementing a method according to the present invention in the form of a computer program or computer program product comprising program code for carrying out all the method steps is also advantageous since this incurs particularly low costs, in particular if an executing controller is also used for other tasks and is therefore present anyway. Suitable data media for providing the computer program are, in particular, magnetic, optical, and electrical memories, for example hard disks, Flash memories, EEPROMs, DVDs, etc. Downloading a program via computer networks (internet, intranet, etc.) is also possible.

Further advantages and configurations of the present invention become apparent from the description herein and the figures.

The present invention is shown schematically in the figures on the basis of an embodiment example and will be described below with reference to the figures.

DETAILED DESCRIPTION OF EXAMPLE EMBODIMENTS

Figure 1:
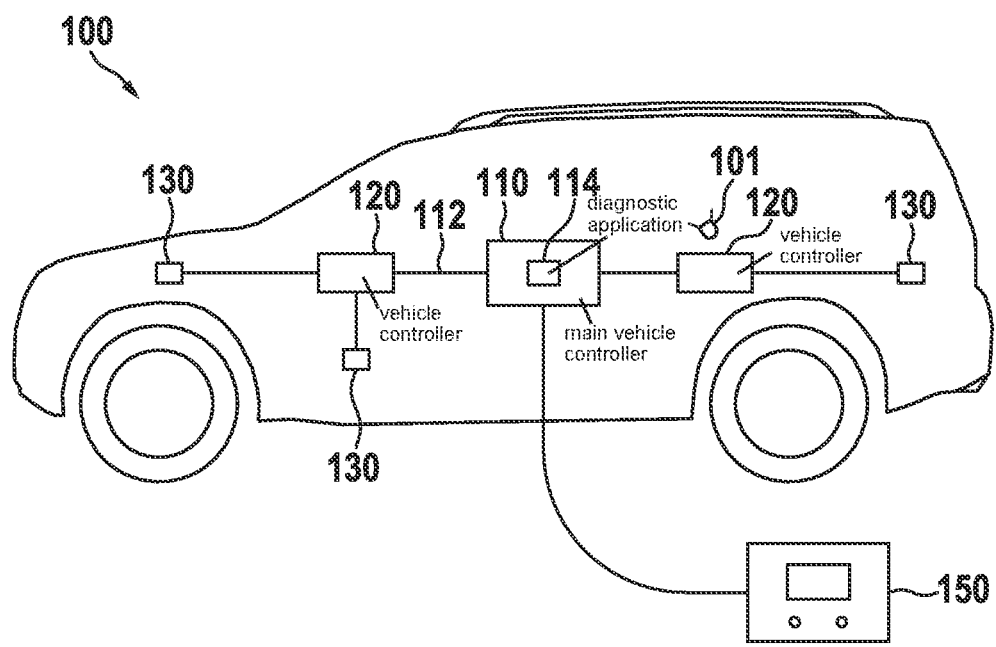
FIG. 1 schematically shows a vehicle electrical system according to an example embodiment of the present invention in a preferred configuration in a vehicle.

FIG. 1 schematically shows a vehicle electrical system 101 according to the present invention in a preferred configuration in a vehicle 100, in which diagnostics proposed in the context of the present invention can be carried out. By way of example, the vehicle electrical system 101 comprises a main vehicle computer 110, two vehicle controllers 120, and a plurality of actuators and sensors 130 (here, no distinction is to be drawn between actuators and sensors).

In this connection, these are arithmetic logic units that intercommunicate, for example by way of one or more communications media 112. Said media need not necessarily be the same for all the links between arithmetic logic units; it is possible for there to be a difference depending on the type of arithmetic logic unit or of arithmetic logic units to be linked. For instance, simpler sensors are coupled merely via LIN, for example, while more complex controllers are coupled via CAN or Ethernet, for example.

By way of example, a diagnostic application 114 (also referred to as system diagnostic software) is executed on the arithmetic logic unit 110 formed as the main vehicle computer. Furthermore, a diagnostic unit 150 (also referred to as a diagnostic tester or a tester) that is external, i.e., does not belong to the vehicle electrical system or vehicle, is shown next to the vehicle 100. Said diagnostic unit is connected to the vehicle electrical system 101, in particular the main vehicle computer 110, via a suitable communications link. By way of example, a so-called "OBD interface" can be used for this purpose. In this case, the diagnostic unit 150 communicates only with the diagnostic application 114 on the main vehicle computer, not with the other arithmetic logic units.

Figure 2:
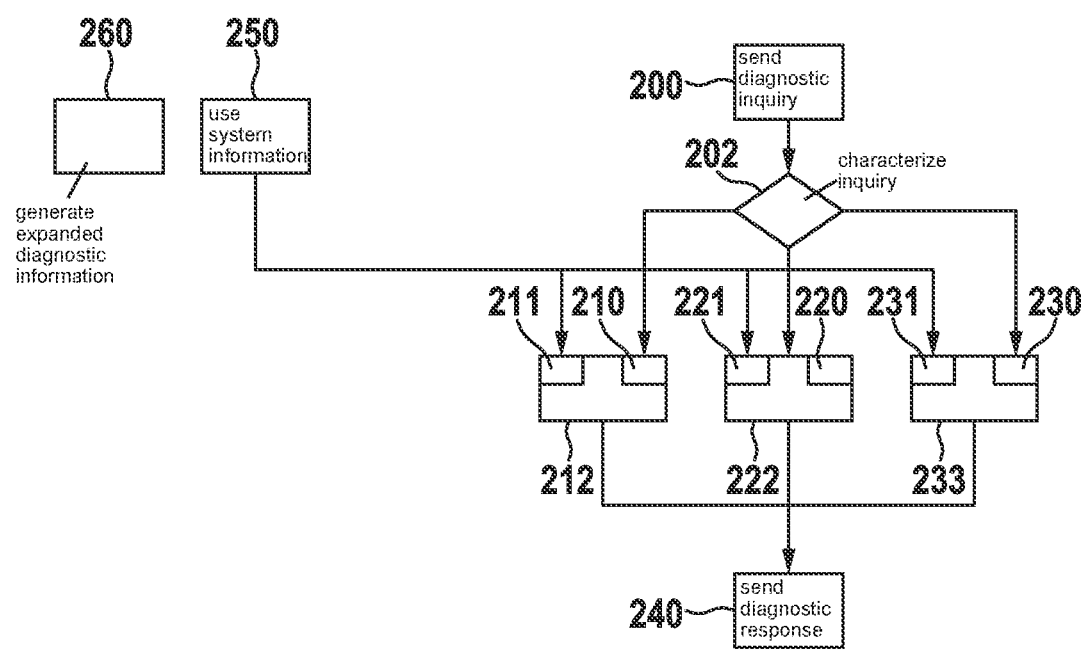
FIGS. 2 to 5 schematically show a sequence of a method according to the present invention in a preferred specific embodiment.

FIG. 2 now shows an overview of the sequence of a method according to the present invention in a preferred specific embodiment, i.e., the sequence of diagnostics in the vehicle electrical system, as shown for example in FIG. 1, or in particular of the individual arithmetic logic units therein.

First, the functioning of the diagnostic application will be described. When the diagnostic application communicates with the diagnostic unit or the arithmetic logic units or controllers of the vehicle electrical system, the standard "Unified Diagnostic Services" (UDS) as defined in the ISO 14229-1:2020 standard is used as the diagnostic protocol, for example. The diagnostic application can, however, also use alternative protocols for communicating with the arithmetic logic units. In that case, the diagnostic application translates the messages from the tester into the other protocol or vice versa.

The "Universal Measurement and Calibration Protocol" (XCP) as defined in the ASAM MCD-1 standard, which is generally frequently used in controller development, is taken into consideration as a protocol variant, for example as an alternative standard, for example for reprogramming. A proprietary protocol defined and deployed accordingly can also be used as another protocol variant. In that case, the protocol would not need to be disclosed (it is used only for the communication between the diagnostic application and the arithmetic logic units in the vehicle electrical system, not for the communication between the diagnostic application and the tester), as a result of which the arithmetic logic units or controllers would be more securely protected by standard tools against attacks.

During the diagnostics, the tester is then first connected to the vehicle electrical system such that communication with the diagnostic application is possible. The tester then sends a diagnostic inquiry (request) 200 to the diagnostic application, which receives it. This diagnostic inquiry 200 can comprise various kinds of messages, specifically, for example, a service message 210, a control message 220, or a programming message 230. These messages from the tester can then, for example, be relayed to one or more arithmetic logic units in the vehicle electrical system.

For this kind of relaying, different variants can be used. One variant is message-based; in this case, the diagnostic application always first receives the entire message before relaying it to an arithmetic logic unit. Another variant is frame-based; in this case, a message is transmitted in segmented form, as is the case, for example, in DoCAN ("Diagnostic communication over Controller Area Network"), as per the ISO 15765-2:2016-04 standard. The message can also be relayed frame by frame after each received frame.

Next, the superordinate sequence of the diagnostics, as shown in FIG. 2 and already briefly explained, will be discussed in more detail. At the start of the program sequence in the diagnostic application, system information 211, 221, 231 is used in a step 250, in particular depending on the various types of messages.

These messages can include data from all the arithmetic logic units that make diagnostic information (e.g., DTC, DID) available (as sources). In the process, a controller, actuator, sensor, or the diagnostic application itself (and the arithmetic logic unit on which it is executed) can be taken into consideration as an arithmetic logic unit or source.

The system information can be generated by different variants. One option is static generation. In this case, the system information is stored in the diagnostic application statically and is updated in the event of a change to the software in a controller.

Another option is generation by learning. In this case, the diagnostic application learns the system information by reading out the arithmetic logic units or sources of the vehicle electrical system, e.g., in the event of a software update in the vehicle electrical system. This has the advantage whereby the diagnostic application need not necessarily be updated after a change to the software of a controller.

In the next steps 212, 222, 232, in which the messages 210, 220 and 230 are processed, use is made of the system information. If the diagnostic application receives a message containing the diagnostic inquiry 200 from the tester, said inquiry is first characterized in step 202, for example on the basis of Service Identification (SID), and delivered to a step 212, 222, or 232 depending on the type.

In the process, and as mentioned, the messages are split into the following types. A service message 210 is a message in which diagnostic information (or diagnostic data) are read from or delivered to the vehicle electrical system or arithmetic logic units (hereinafter also referred to simply as the "system"). In UDS, these are, for example, "ReadDataByIdentifier," "InputOutputControlByIdentifier," or "ReadDTCInformation."

A control message 220 is a message in which the system or a particular arithmetic logic unit is to be put into a particular state. In UDS, these are, for example, "SessionControl," "Authentication," or "ControlDTCSetting." Different services can thus be activated in an arithmetic logic unit, for example. A programming message 230 is a message used directly for writing or reading the controller software (program data). In UDS, these are, for example, "RequestDownload," "TransferData," or "RequestTransferExit." However, these can also include special routines, for example for erasing or reviewing a memory area.

According to the type of message, a step or action is then carried out in which a response is obtained where applicable (for example if the message is relayed to an arithmetic logic unit, which then returns a response) and is then sent back to the tester in or as a part of a diagnostic response 240. This completes a run-through of this path. The arrival of a new message starts it again from the beginning.

If the diagnostic application receives an update to the internal data from the system, for example via normal communication, the updated data are delivered to the block 260. In this block, the expanded diagnostic information is then generated. This information can be queried when a message 210 arrives. This completes this path. The arrival of a new update starts it again from the beginning.

Figure 3:
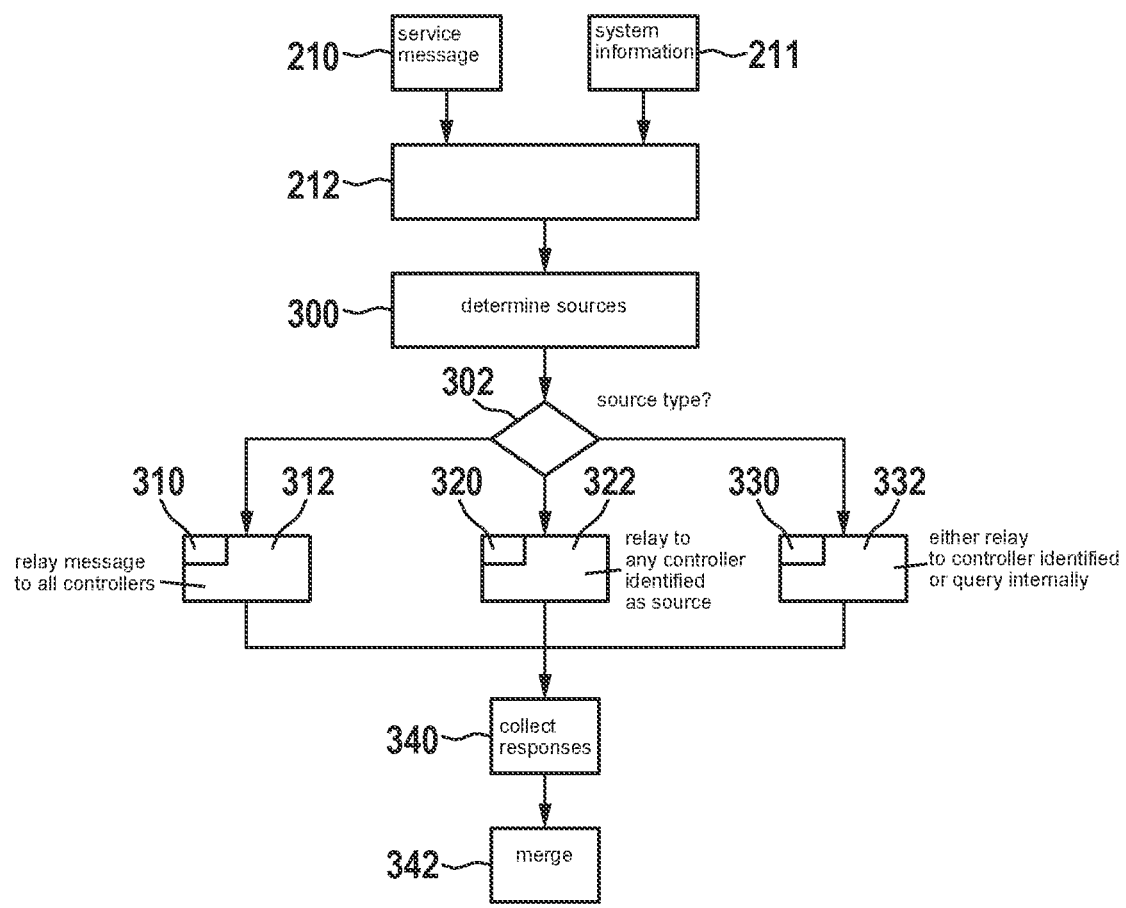

FIG. 3 illustrates the handling of a service message 210 in more detail. If the system information 211 and a service message 210 are applied to the inputs of step 212, the following activity is carried out. In step 300, on the basis of the identification of the service message, of a possible sub-function, and of one or more pieces of diagnostic information, it is determined which sources (arithmetic logic units) are making them available (the system information is used for this purpose). The result is then also the source type 302 and thus how the message has to be relayed to the controllers or arithmetic logic units.

The type of source can be a system source 310. Each controller and the diagnostic application are sources for the requested information. In step 312, the message is functionally relayed to all the controllers. In addition, the diagnostic application queries the information internally.

The type of source can be a multi-source 320 (a plurality of sources). A plurality of controllers (but not necessarily all the controllers) and/or the diagnostic application are sources for the requested information. In step 322, the message is physically relayed to any controller identified as a source (or addressed as such). In the process, before being relayed the message can be divided up according to the requested diagnostic information, such that each source can only request the information it has made available. If the diagnostic application is one of the sources, the diagnostic application queries the corresponding information internally.

The type of source can also be a single source 330. A controller or the diagnostic application is the source for the requested information. In step 332, either the message is physically relayed to the controller identified as the source or the diagnostic application queries the information internally.

In step 340, the responses of the sources are collected and merged into one response 342. This response is delivered to the superordinate sequence via the output and is thus in particular sent to the diagnostic unit as a part of the diagnostic response.

Figure 4:
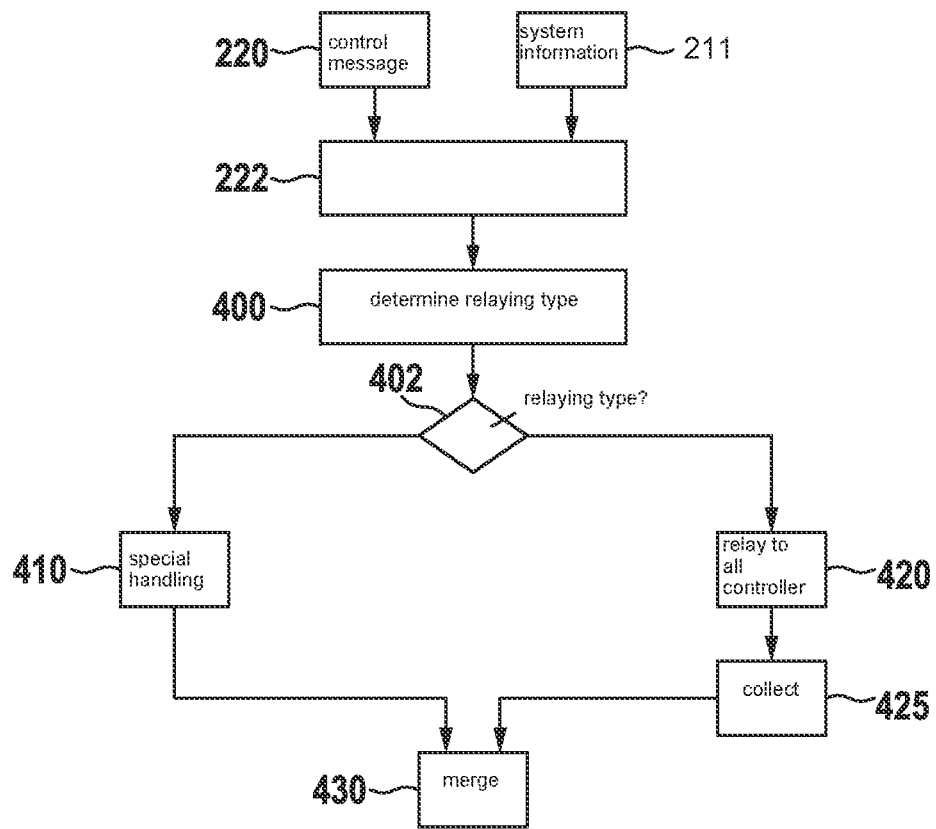

FIG. 4 illustrates the handling of a control message 220 in more detail. If the system information 211 and a control message 220 are applied to the inputs of step 222, the following activity is carried out. In step 400, on the (sole) basis of the identification of the control message, the relaying type 402 thereof is determined, i.e., whether it is relayed directly to all the controllers or there is a special handling.

In the event that no direct relaying is provided, there is a special handling or action 410 for the control message. These messages include "SecurityAccess," "Authentication," and "TesterPresent." Optionally, the latter can also be relayed.

In the first two control messages, information for security mechanisms is transmitted, for example, and additional functions are made accessible on the basis thereof. These mechanisms can be implemented differently in each controller, so there cannot be any direct relaying here. In this case, the diagnostic application should know the mechanisms in each controller and communicate with the controllers accordingly. From the responses thereof, the diagnostic application then generates the final response to the external tester.

"TesterPresent" is, for example, a piece of information for the diagnostic application according to which it is to remain in a previously controlled state. Since each controller is also in this state, the controllers likewise have to be kept therein. This can be done by relaying the inquiry and also by periodically forwarding the message to the controllers discretely, independently of an inquiry from the tester.

If the special handling 410 is carried out, the response 430 is delivered to the superordinate sequence via the output.

In the case of a system source, in step 420 the message is functionally relayed to all the controllers. In step 425, the responses are collected and merged into the response 430. This response is delivered to the superordinate sequence via the output.

Figure 5:
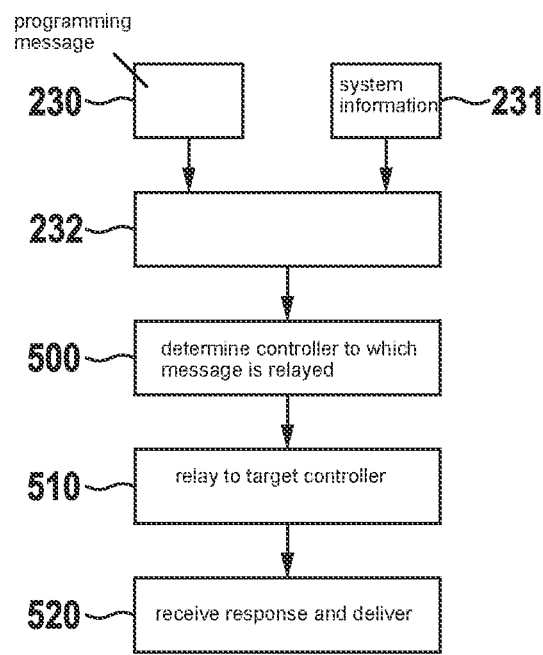

FIG. 5 illustrates the handling of a programming message 230 in more detail. If the system information 231 and a programming message 230 are applied to the inputs of step 232, the following activity is carried out. In step 500, the controller to which the message is relayed is determined on the basis of address information in said message.

In step 510, the message is physically relayed to the target controller. In step 520, the response is received and delivered to the superordinate sequence via the output.

Overall, diagnostics of a vehicle electrical system in a vehicle comprising a multiplicity of arithmetic logic units or controllers in which the tester communicates only with the diagnostic application are therefore made possible. The communication with the arithmetic logic units in the vehicle electrical system occurs via the diagnostic application and can therefore be carried out independently of the tester in terms of, for example, the communications protocol to be used or the selection of messages that are then actually relayed.

What is claimed is:

1. A method of a vehicle electrical system of a vehicle for handling diagnostics communications with an external diagnostic unit via a vehicle interface, the vehicle electrical system including a plurality of arithmetic logic units electrically communicating with one another internally within the vehicle, the method comprising the following steps being performed by an execution of a diagnostic application on one arithmetic logic unit of the plurality of arithmetic logic units:

receiving, by the diagnostic application, a diagnostic inquiry from the external diagnostic unit without an address identifying any of the plurality of arithmetic logic units;

analyzing, by the diagnostic application, content of the diagnostic inquiry;

based on a result of the analysis of the content of the diagnostic inquiry, determining, by the diagnostic application, at least one of the plurality of arithmetic logic units that is relevant to the diagnostic inquiry; and based on the determination, performing at least one of the following two steps (a)-(b):
   (a) transmitting, by the diagnostic application, a message to the at least one of the arithmetic logic units to obtain diagnostics information to provide to the external diagnostic unit, to control the at least one of the arithmetic logic units to enter a defined state, or to reprogram the at least one of the arithmetic logic units; and
   (b) sending a diagnostic response to the external diagnostic unit.

2. The method as recited in claim 1, wherein, when the diagnostic inquiry includes a service message which the diagnostic application determines pertains to the at least one arithmetic logic unit of the plurality of arithmetic logic units from which diagnostic data are to be read out and/or to which diagnostic data are to be delivered, the diagnostic application relays the service message or the diagnostic data to the at least one arithmetic logic unit and/or sends diagnostic data concerning the at least one arithmetic logic unit to the external diagnostic unit as a part of the diagnostic response.

3. The method as recited in claim 2, wherein the diagnostic application receives the diagnostic data from the at least one arithmetic logic unit and sends the diagnostic data to the external diagnostic unit as a part of the diagnostic response.

4. The method as recited in claim 2, wherein the diagnostic application analyzes data and/or signals exchanged between the plurality of arithmetic logic units and generates expanded diagnostic information based on the data and/or signals exchanges, and wherein the diagnostic data are determined by the diagnostic application based on the expanded diagnostic information and are sent to the external diagnostic unit as a part of the diagnostic response without any message being sent by the diagnostic application to any of the plurality of arithmetic logic units in response to the diagnostic inquiry.

5. The method as recited in claim 4, wherein, independently of a timing of a diagnostic inquiry, the diagnostic application analyzes the data and/or signals exchanged between the plurality of arithmetic logic units and generates the expanded diagnostic information based on the data and/or signals exchanged.

6. The method as recited in claim 1, wherein the diagnostic inquiry includes a control message according to which the diagnostic application places at least one arithmetic logic unit of the plurality of arithmetic logic units into a predetermined state.

7. The method as recited in claim 1, wherein:
   the diagnostic inquiry includes a programming message that the diagnostic application determines pertains to precisely one arithmetic logic unit of the plurality of arithmetic logic units to which program data are to be written and/or from which program data are to be read; and the diagnostic application:
   (i) relays, to the precisely one arithmetic logic unit, the programming message or program data to be written, and/or
   (ii) receives program data from the precisely one arithmetic logic unit, and sends the program data to the external diagnostic unit as a part of the diagnostic response.

8. The method as recited in claim 1, wherein the determination is based on system information that is initially and/or repeatedly stored in the diagnostic application.

9. The method as recited in claim 8, wherein the system information is determined or generated dynamically by reading out the plurality of arithmetic logic units.

10. The method as recited in claim 1, wherein the diagnostic inquiry is received by the diagnostic application by way of a first protocol, and data are sent to the at least one arithmetic logic unit by way of a second protocol that is different from the first protocol.

11. The method as recited in claim 1, wherein the plurality of arithmetic logic units are selected from: main vehicle computers, vehicle controllers, actuators, and sensors.

12. The method as recited in claim 1, wherein the method includes, based on the determination, the transmitting, by the diagnostic application, of the message to the at least one of the arithmetic logic units to obtain the diagnostics information to provide to the external diagnostic unit.

13. The method as recited in claim 1, wherein the method includes, based on the determination, the transmitting, by the diagnostic application, of the message to the at least one of the arithmetic logic units to control the at least one of the arithmetic logic units to enter the defined state.

14. The method as recited in claim 1, wherein the method includes, based on the determination, the transmitting, by the diagnostic application, of the message to the at least one of the arithmetic logic units to reprogram the at least one of the arithmetic logic units.

15. The method as recited in claim 1, wherein the method includes, based on the determination, sending the diagnostic response to the external diagnostic unit.

16. The method as recited in claim 1, wherein the diagnostic application is configured for the determining to be of just one of the plurality of arithmetic logic units to which to transmit the message in a first instance, to be of a subset of more than one and less than all of the plurality of arithmetic units to which to transmit the message in a second instance, to be of all of the plurality of arithmetic units to which to transmit the message in a third instance, and to be of none of the plurality of arithmetic units to which to transmit the message in a third instance, a response to the diagnostic inquiry being made by the diagnostic application to the external diagnostic unit in the third instance based on data collected by the diagnostic application prior to the diagnostic inquiry.

17. An arithmetic logic unit, which is one of a plurality of arithmetic logic units of a vehicle electrical system of a vehicle, which plurality of arithmetic logic units electrically communicate with one another internally within the vehicle, the arithmetic unit being programmed with a diagnostic application by execution of which the arithmetic logic unit is configured to handle diagnostics communications with an external diagnostic unit via a vehicle interface of the vehicle by performing the following:
   receiving, by the diagnostic application, a diagnostic inquiry from the external diagnostic unit without an address identifying any of the plurality of arithmetic logic units;

analyzing, by the diagnostic application, content of the diagnostic inquiry;

based on a result of the analysis of the content of the diagnostic inquiry, determining, by the diagnostic application, at least one of the plurality of arithmetic logic units that is relevant to the diagnostic inquiry; and based on the determination, performing at least one of the following two steps (a)-(b):

(a) transmitting, by the diagnostic application, a message to the at least one of the arithmetic logic units to obtain diagnostics information to provide to the external diagnostic unit, to control the at least one of the arithmetic logic units to enter a defined state, or to reprogram the at least one of the arithmetic logic units; and (b) sending a diagnostic response to the external diagnostic unit.

18. A vehicle electrical system of a vehicle, comprising:

a plurality of intercommunicating arithmetic logic units that electrically communicate with one another within the vehicle, wherein one of the arithmetic logic units is programmed with a diagnostic application by execution of which the one arithmetic logic unit is configured to handle diagnostics communications with an external diagnostic unit via a vehicle interface of the vehicle by performing the following:

receiving, by the diagnostic application, a diagnostic inquiry from the external diagnostic unit without an address identifying any of the plurality of arithmetic logic units;

analyzing, by the diagnostic application, content of the diagnostic inquiry;

based on a result of the analysis of the content of the diagnostic inquiry, determining, by the diagnostic application, at least one of the plurality of arithmetic logic units that is relevant to the diagnostic inquiry; and based on the determination, performing at least one of the following two steps (a)-(b):

(a) transmitting, by the diagnostic application, a message to the at least one of the arithmetic logic units to obtain diagnostics information to provide to the external diagnostic unit, to control the at least one of the arithmetic logic units to enter a defined state, or to reprogram the at least one of the arithmetic logic units; and (b) sending a diagnostic response to the external diagnostic unit.

19. A non-transitory machine-readable storage medium on which is stored a diagnostic application that is executable by one arithmetic logic unit of a plurality of logic units of a vehicle electrical system of a vehicle, the plurality of arithmetic logic units electrically communicating with one another internally within the vehicle, the diagnostic application, when executed by the one arithmetic logic unit of the arithmetic logic units, causing the one arithmetic logic unit to handle diagnostics communications with an external diagnostic unit via a vehicle interface by performing the following steps:

receiving, by the diagnostic application, a diagnostic inquiry from the external diagnostic unit without an address identifying any of the plurality of arithmetic logic units;

analyzing, by the diagnostic application, content of the diagnostic inquiry;

based on a result of the analysis of the content of the diagnostic inquiry, determining, by the diagnostic application, at least one of the plurality of arithmetic logic units that is relevant to the diagnostic inquiry; and based on the determination, performing at least one of the following two steps (a)-(b):

(a) transmitting, by the diagnostic application, a message to the at least one of the arithmetic logic units to obtain diagnostics information to provide to the external diagnostic unit, to control the at least one of the arithmetic logic units to enter a defined state, or to reprogram the at least one of the arithmetic logic units; and (b) sending a diagnostic response to the external diagnostic unit.

* * * * *